United States Patent [19]

Pitner

[11] 4,050,130
[45] Sept. 27, 1977

[54] METHOD FOR MOUNTING A BEARING IN A UNIVERSAL JOINT

[75] Inventor: Alfred Pitner, Paris, France

[73] Assignee: Nadella, France; a part interest

[21] Appl. No.: 499,011

[22] Filed: Aug. 20, 1974

[30] Foreign Application Priority Data

Aug. 23, 1973 France .................. 73.30579
Dec. 28, 1973 France .................. 73.47062

[51] Int. Cl.² .......................... B21D 53/10
[52] U.S. Cl. .................. 29/149.5 R; 29/434; 64/17 A; 308/163
[58] Field of Search ............ 29/434, 445, 148.4 A, 29/149.5 R; 64/17 A, 17 R; 308/207 R, 163

[56] References Cited

U.S. PATENT DOCUMENTS

| | | | |
|---|---|---|---|
| 1,943,814 | 1/1934 | Cutting | 64/17 R |
| 1,987,415 | 1/1935 | Padgett | 29/434 |
| 2,141,264 | 12/1938 | Cutting | 64/17 A |
| 2,217,082 | 10/1940 | Swenson | 64/17 R |
| 3,062,026 | 11/1962 | Pitner | 64/17 A |
| 3,178,907 | 4/1965 | Lyons | 64/17 A |
| 3,353,374 | 11/1967 | Buthenhoff | 64/17 R |
| 3,589,143 | 6/1971 | Batt | 64/17 A |
| 3,651,663 | 3/1972 | Lange et al. | 64/17 A |
| 3,779,039 | 12/1973 | Schultenkamper | 64/17 A |

FOREIGN PATENT DOCUMENTS

| | | | |
|---|---|---|---|
| 1,279,521 | 11/1961 | France | 64/17 A |
| 906,105 | 9/1962 | United Kingdom | 64/17 A |

Primary Examiner—C.W. Lanham
Assistant Examiner—Daniel C. Crane
Attorney, Agent, or Firm—Robert E. Burns; Emmanuel J. Lobato; Bruce L. Adams

[57] ABSTRACT

Method for mounting a cylindrical bearing having a closed end wall around a trunnion of a cross member of a universal joint by fitting the bearing in a bore of the corresponding yoke under such conditions that the end wall of the bearing affords an elastically yieldable support, optionally through intermediate means, for the end face of the trunnion. The method comprises giving to the end face of the trunnion and to the parts conjugate therewith, namely the end wall of the bearing and/or the intermediate means, such an arrangement that, in a first stage of said fitting, when the parts conjugate with the end face merely come in contact with the latter and possibly in mutual contact, a first axial distance between the open end of the bearing and the end face is distinctly less than a second axial distance which must be finally obtained between the open end of the bearing and the end face. Thereafter, the end wall of the bearing and/or the intermediate means are plastically deformed, in a final stage of said fitting, so as to eliminate the difference between said two axial distances and thereby achieve said elastically yieldable support by elastic return consecutive to the plastic deformation.

2 Claims, 14 Drawing Figures

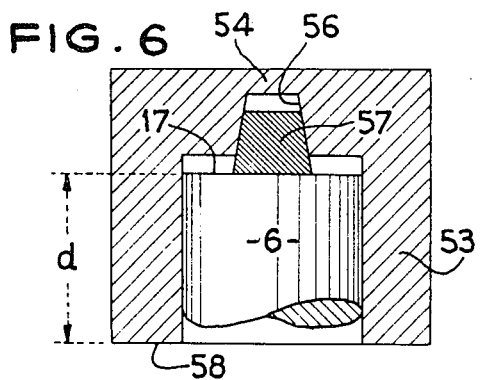
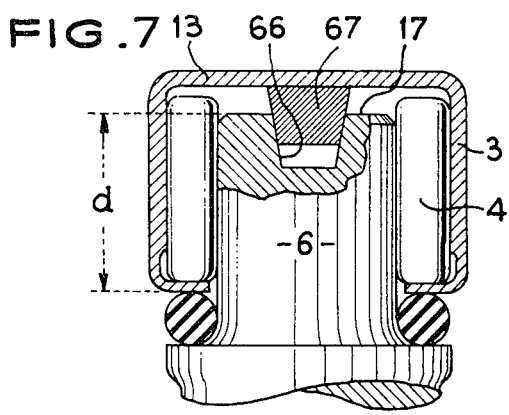
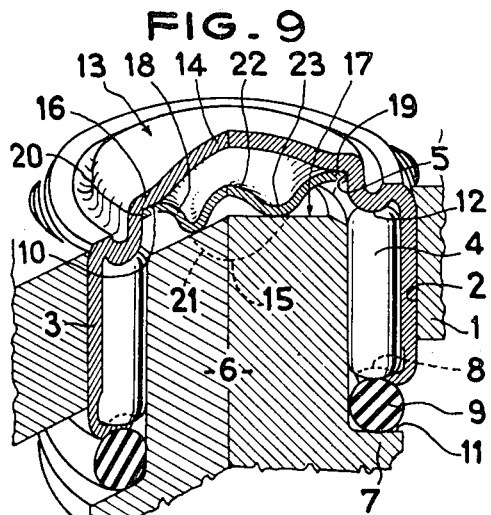
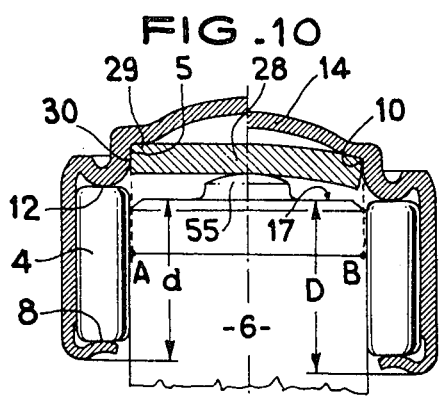
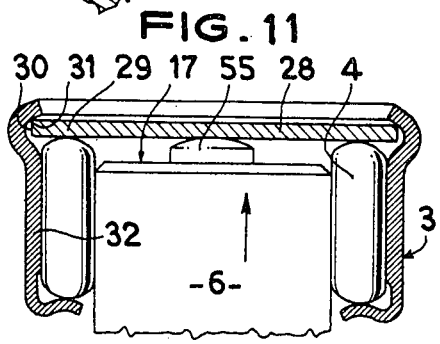
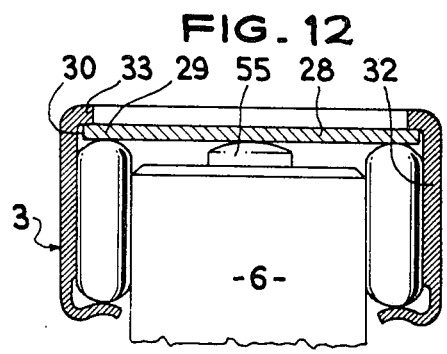
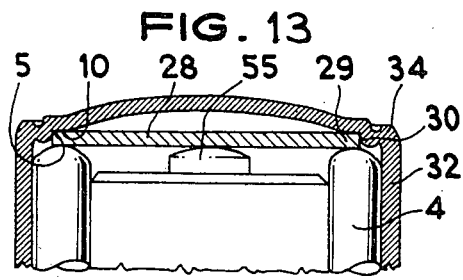
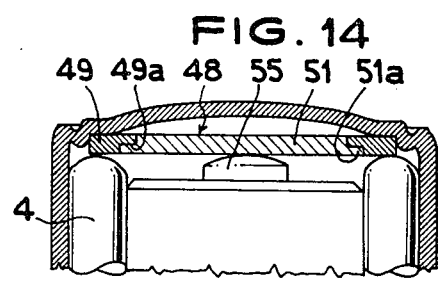

METHOD FOR MOUNTING A BEARING IN A UNIVERSAL JOINT

The present invention relates to universal joints comprising two yokes and a cross member whose trunnions are each capped with a bearing closed at one end and maintained in the corresponding bore of each one of the yokes.

These bearings should normally be inserted and fixed in position with high precision so as to ensure, with a clearance or allowance in the neighborhood of zero which is either positive or negative, the maintenance of the cross member in the yoke, since in most applications the presence of a positive axial allowance between the end faces of the trunnions of the cross member and the end wall of the bearings results in operational noise, for example tapping, or, when it concerns universal joints rotating at high speed, gives to the cross member and consequently to the other yoke carrying the other pair of trunnions a position which is offset with respect to the position ensuring a correct centering so that the shaft attached to this other yoke is no longer balanced.

There is therefore a close relationship between the good operation of the universal joint from the point of view of noise and vibrations, irrespective of the application and speed of rotation, and the absence of axial clearance between the cross member and the bearings of each one of the yokes.

In a known arrangement, an elastically yieldable element in interposed between the end face of at least one trunnion of the cross member and the closed end of the corresponding bearing. This requires, if the aforementioned condition is to be satisfied, an extremely precise dimensioning of this end face of the trunnion with respect to the end wall of the bearing with which it cooperates, which precision is also necessary in respect of the means for fixing the bearing if a practically zero clearance is to be obtained, bearing in mind that an excessive clearance, if positive, results in the aforementioned drawbacks. Also, a negative allowance that is to say an assembly under stress, not only results in high friction in operation which is unacceptable in most applications of universal joints owing to the high tilting torque which results but may also destroy the bearing capping the trunnion. These drawbacks are still worse when the bearing is produced in the now conventional manner from pressed, often thin, sheet steel which has been made very hard by a case hardening.

Also, in accordance with an arrangement disclosed in French Patent No. 1,501,925 of which the applicants are the proprietors, it is known to achieve a clearance-free maintenance of the cross member with respect to each one of the yokes by interposing between a shoulder of the trunnion and a radial flange of a needle cup constituting the bearing, whose end wall is spaced from the end face of the trunnion, an elastically yieldable ring which also performs the function of a sealing element. Although this solution has big advantages owing to the elastically yieldable centering achieved, it may in certain cases be necessary to disassociate the sealing function from the axial maintenance since the two functions may be contradictory and consequently fail to satisfy the optimum conditions required for each one thereof.

An objet of the present invention is to provide axial maintaining means which are different from and simpler to employ than the known means.

According to the invention there is provided a method for mounting around a trunnion of a cross member of a universal joint, by fitting it in a bore of the corresponding yoke, a cylindrical bearing, open at one end and closed by a wall at the other end, under such conditions that in the final position the end wall of the bearing affords an elastically yieldable support for the end face of the cross member, optionally with interposition of intermediate means, wherein said end face and the parts conjugate therewith, namely the end wall of the bearing and/or the intermediate means, are so arranged that, in the first stage of the fitting when the parts conjugate with the end face of the trunnion simply come in contact with the end face of the trunnion and possibly in mutual contact, the axial distance between the open end of the bearing and the end face of the trunnion is distinctly less than the distance which must be finally obtained, and, at the end of the fitting, the end wall of the bearing, or the intermediate means, is plastically deformed so as to eliminate the diffence between said distances and achieve the required elastically yieldable support under the effect of the elastic return consecutive to said plastic deformation.

Owing to the fact that the forces arising in the course of operation are much less than those which were employed for ensuring both the fitting of the bearing and the plastic deformation of the end wall of the bearing, or of the intermediate means, this end wall of the bearing or these intermediate means operate constantly within the elastic deformation range so that the cross member may be maintained in position, owing to the elastic prestressing produced between the end wall of the bearing and the end face of the trunnion, with wide tolerances in the manufacture of the bearings and of the cross member since the plastic deformation enables avoiding any machining and any very precise fitting when fitting each of the bearings in its bore.

It is possible to employ this maintaining system according to the invention for all the trunnions, for one thereof or certain thereof. In particular, one trunnion may be equipped in this manner and the opposite trunnion may have a support which does not employ the arrangement described hereinbefore. As a result of this, moreover, the machining tolerances may also be widened since every other trunnion permits, owing to the utilisation of the system described hereinbefore, an accomodation of inaccuracies which are compensated for a plastic deformation to the required extent of the intermediate means between the end wall of the bearing and the end face of the trunnion, or of the end wall of the bearing itself.

Preferably there is employed for creating the axial prestressing an axially deformable washer interposed between the end wall of the bearing and the end face of the trunnion. This washer may have very diverse forms. It may have a single thickness, be solid or apertured, include a peripheral portion applied against the end wall of the bearing which may be continuous or discontinuous. It may also have a double thickness; it may be produced for example in the form of a hollow body of revolution constituting a flattened sphere or an element similar to a capsule the top of which has preferably a circular opening to improve its elasticity.

In order to ensure, in the course of mounting, that the washer does not move relative to the trunnion and depart from the precise position, which is on principle coaxial, which it must occupy in order that the plastic deformation and the final elastic stress be achieved under the required conditions, the invention provides an additional arrangement in which a portion of the washer is engaged in locating means provided inside the bearing to ensure its location with respect to the trunnion.

The locating means may have various forms which vary in accordance with the type of the bearing employed.

According to a first embodiment, the closed end wall of the bearing constitutes an end wall which is integral with the cylindrical part of the bearing and the aforementioned locating means are constituted by a centering rebate or the like provided in the end wall the bearing, said rebate defining a surface against which said portion of the washer bears.

According to a second embodiment of the invention, the end wall of the bearing is constituted by the washer itself, in which case the locating means are constituted by a groove, for example a circular groove, provided in the cylindrical body of the bearing, or by a continuous or discontinuous radial flange on the cylindrical wall of the bearing against which said washer bears.

Further features and advantages of the invention and its operation wll be described hereinafter with reference to the accompanying drawings given by way of example and in which:

FIG. 6 is a sectional view of a cup constituting a smooth bearing capping a trunnion wth interposition, between the trunnion and the end wall of the cup, of a conical stud engaged in the end wall of the cup;

FIG. 7 is a sectional view of a needle cup capping a trunnion with interposition of a conical stud engaged in the end face of the trunnion.

FIG. 9 is a partial sectional view of a washer centered in the end wall of the bearing and cooperating with the plane face of the trunnion;

FIG. 10 is a sectional view of a planar washer centered in the end wall of a bearing and cooperating with a spigot on the end face of the trunnion, the bearing cup and washer being shown in the two successive positions they occupy relative to the cross member in the course of mounting;

FIG. 11 is a sectional view of the washer, before its deformation, which is centered in a recess provided inside the bearing and constitutes the end wall of the latter;

FIG. 12 is a sectional view of a modification of the arrangement shown in FIG. 11 in which the washer is centered by a radial flange of a bearing having an open end;

FIG. 13 is a sectional view of a modification of the arrangement shown in FIG. 10, before deformation of the washer in which the peripheral portion of the washer comes in contact with the ends of the needles, and FIG. 14 is a sectional view of a modification of the washer in which the washer is in two parts.

Figure 1:
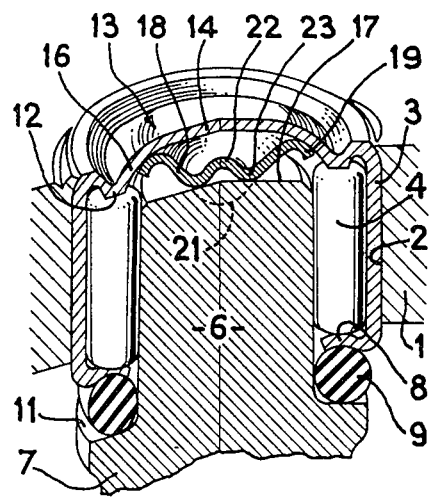
FIG. 1 is a partial sectional view of a universal joint yoke in which there is mounted a needle cup which caps a trunnion of a cross member with interposition of an elastically yieldable washer.

FIG. 1 shows a part of a yoke 1 of a universal joint in the bore 2 of which yoke there is fitted a pressed thin sheet metal cup 3 which caps, with interposition of needles 4, the trunnion 6 of a cross member 7 of the universal joint. The needles 4 bear at their respective ends against a flange 8 of the cup 2 which axially compresses a sealing element 9 against a shoulder 11 on the cross member, and on an annular rib 12 formed adjacent the periphery of the end wall 13 of the cup. The centre portion 14 of the end wall 13 is substantially planar and connected to the annular rib 12 at 16.

Between the end face 17 of the trunnion 6 and the end wall 13 of the cup, there is interposed a washer as disc 18 which has a peripheral portion 19 bearing against the end wall of the cup and a centre portion which, in the first stage of the fitting of the cup 3 in the bore 2, defines a depression 21 whose convex side is in contact with the end face 17 of the trunnion 6 — which is then at a distance $d$ from the flange 8 — and which, at the end of the fitting, undergoes a plastic deformation producing a reversal of the profile which results in a dome 22 whose concave side faces the end face 17 and which is connected by a convex annular portion 23, bearing against the end face 17, to the peripheral portion 19 of the washer 18.

At the end of the fitting, the end face 17 is located at a distance D which is distinctly greater than $d$ from the flange 8 of the cup. In its final position shown in FIG. 1, the washer 18 affords an elastic prestressing between the cup end wall 13 and the end face 17 under the effect of the elastic return consecutive to the plastic deformation.

Figure 2:
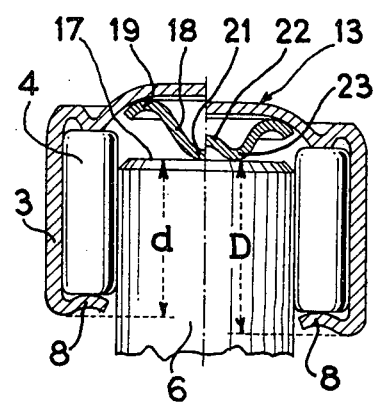
FIG. 2 is a sectional view of the cup shown in FIG. 1 showing two successive positions occupied by the cup with respect to the cross member in the course of mounting.
Figure 3:
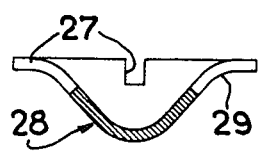
FIGS. 3 and 4 are sectional views of two modifications of the elastically yieldable washer shown in FIGS. 1 and 2.

Whereas in FIGS. 1 and 2 the peripheral portion 19 of the washer 18 is continuous the peripheral portion 29 of the washer or disc 28 shown in FIG. 3 has notches 27 which increase the flexibility of the washer.

Figure 4:
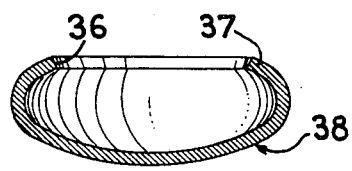

The washer or disc 38 shown in FIG. 4 is in the form of a hollow body or revolution whose axis coincides with the axis of the trunnion 6 and which has approximately the shape of a flattened sphere the top of which has a circular opening 36 which defines a parallel of the hollow body and whose edges 37 are adapted to bear against the cup end wall cup 13.

Figure 5:
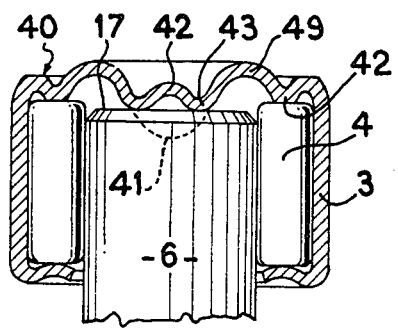
FIG. 5 is a sectional view of a needle cup in which the elastic prestressing in a direction parallel to the axis of the trunnion is achieved by the deformation of the end wall of the cup.

In FIG. 5, the elastic prestressing is due to the elasticity proper of the end wall 40 of the cup 3 which, in the beginning of the fitting, has a centre portion 41 defining a depression whose convex side is in contact with the end face 17 of the trunnion 6 and which, at the end of the fitting, undergoes a plastic deformation resulting in the reversal of the profile which produces a center dome 42 whose concave side faces the end face 17 and which is connected by an annular portion 43 to the concave portion 49 connected to the annular rib 12.

The trunnion 6 shown in FIG. 6 is capped by a cup 53 of a deformable self-lubricating material which constitutes a smooth bearing whose end wall 54 includes a center conical cavity 56 in which is engaged a conical stud 57 which is composed of a material which is harder than that of the bearing 53 and is carried by the end face 17 of the trunnion 6. At the beginning of the fitting, the end face 17 is at a distance $d$ from the open end 58 of the bearing 53, the stud 57 being merely in contact with the conical surface of the cavity 56. At the end of the fitting, the material of the end wall of the cup or bearing 54 defining the conical cavity 56 undergoes a plastic deformation which causes the conical stud 57 to penetrate still further so that the distance d is increased. The elastic return consecutive to the plastic deformation creates the required axial prestressing.

In FIG. 7, the end wall 13 of the needle cup 3 carries a conical stud 67 which is of deformable and preferably self-lubricating material and engages in a conical cavity 66 formed in the end face 17 of the trunnion 6. In a manner comparable to that just described with reference to FIG. 6, the conical stud 67 undergoes a plastic deformation at the end of the fitting and produces an axial prestressing. Moreover, the shape of the end wall 13 of the cup may be chosen in such a manner as to increase its elasticity.

Figure 8:
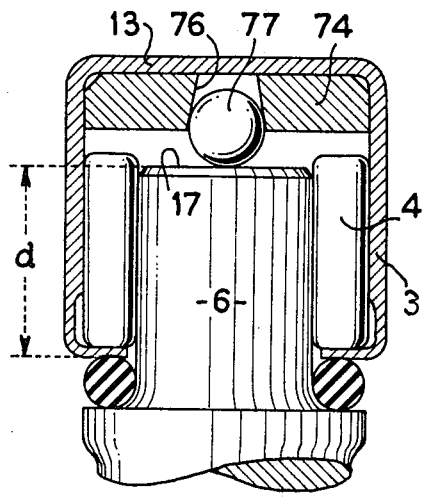
FIG. 8 is a sectional view of a needle cup capping a trunnion with interposition of a ball engaged in a washer applied against the end wall of the cup.

In FIG. 8 a washer 74 of deformable material is fitted in the end 13 of the needle cup 3 and defines a center conical opening 76 in which is engaged a steel ball which bears against the end face 17. At the end of the fitting, the ball 77 produces in the washer 74 a plastic deformation followed by an elastic return creating the axial prestressing. The shape of the washer 74 may be so chosen as to increase its elasticity in that it approaches the shape described and shown in FIGS. 2 and 3 for steel washers.

The embodiment shown in FIG. 9 conforms to the embodiment shown in FIG. 1 except that, in the initial stage of the fitting, the washer or disc 18 is located by its centering with respect to the axis of the trunnion owing to the presence of a rebate 10 in the end wall of the cup in which the peripheral portion 19 of the washer is fitted, the edge 20 of the washer bearing against the radial surface 5 of the rebate.

It will be clear that the rebate 10 centers the washer by causing its axis to coincide with the axis of the trunnion so as to permit the end face 17 of the latter to engage the washer in the course of fitting at the lowermost point 15 of the depression 21, that is to say in a position in which the trunnion and the depression have the same axis, so as to achieve, when the distance D − d is cancelled out, the plastic deformation required for obtaining the correct inversion of the initial profile of the depression 21 of the washer so that it can exert the required elastic prestressing, due to the elastic return of the deformed material, between the end wall 14 of the cup and the face of the trunnion which remains centered in operation with respect to the deformation obtained.

FIG. 10 shows an embodiment which has particular advantages and in which the washer or disc 28 is constituted by a substantially planar disc whose peripheral edge 30 bears against the radial surface 5 of the rebate 10 formed in the end wall of the cup. The outer face 17 of the trunnion 6 includes a spigot 55 coaxial with the latter. The washer is centered with respect to the end wall of the cup in a horizontal plane perpendicular to the axis of the spigot and this permits the spigot to effect the correct plastic deformation of the washer, to impart thereto a part-dome shape with the concave side adjacent the face 17 of the trunnion, in the course of the mounting of the trunnion in the cup ensures the elastic prestressing effect which the washer must have between the end wall of the cup and the end face 17 which, as before, remains centered in operation with respect to the deformation obtained.

FIG. 11 corresponds to the initial stage of the fitting that is to say before the plastic deformation of the washer or disc, and concerns a modification in which the bearing 3, having needles 4, is closed by an end wall constituted by the washer 28. The location of the latter with respect to the axis of the trunnion is ensured by the presence in the cylindrical wall 32 of the bearing of a circular groove 31 adapted to receive the peripheral edge 30 of the washer. The needles 4 are then in abutment against the peripheral portion 29 of the washer.

FIG. 12 shows a modification of the arrangement shown in FIG. 11 in which the bearing end, closed by the planar washer or disc 28, has a radial flange 33 which locates the washer 28 constituting the end wall of the bearing.

FIG. 13 shows a modification of the arrangement shown in FIG. 10 which simplifies the construction of the bearing while increasing its strength. For this purpose the end wall of the bearing is devoid of the annular rib 12 and merely has a locating rebate 10, the ends of the needles 4 coming in contact with the peripheral portion 29 of the washer or disc whereas the portion connecting the cylindrical portion of the bearing to the end wall of the bearing in the region of the rebate has a generally rounded shape 34 which enhances the resistance to loads.

In order to ensure that in the course of operation the ends of the needles do not penetrate the washer, it is preferable to subject the latter to a complete or localized heat treatment; this treatment may be advantageously carried out at the same time as the heat treatment of the bearing after the washer has been inserted in the latter.

FIG. 14 shows a modification in which the washer or disc 48 is constituted by two parts, namely an annular first part 49 which has undergone a heat treatment, possibly simultaneously with the bearing, and comes, when centered in the rebate 10, in contact with the ends of the needles 4, and a second part 51 which is complementary to the first part and is constructed in the form of an initially flat disc which is centered with respect to the ring or first part 49 and is adapted to undergo the aforementioned plastic deformation. For this purpose the disc 51 has a peripheral tongue portion 51a which is engaged in a recess 49a in the ring 59.

Note that in the case of the use of a planar washer or disc and of a bearing in the form of a cup, the clearance between its edge and the axial wall of the rebate is in no way critical, since the plane in which the washer in the rebate is operative when engaged by the trunnion is defined by the circle of diameter AB which is a projection on the surface of said washer of the spherical dome 14 of the end wall of the bearing defining the radial wall of the rebate.

Moreover, note that a planar washer is reversible and therefore does not have a privileged direction as concerns its introduction in the cup and its centering in the rebate.

The bearing surface of the end face of the trunnion may be produced by any method, as by machining, supplying material or deforming material. In particular, the technique employing the upsetting of material described in French patent application No. 73 19, 526 filed by the applicant may be employed.

In the embodiments shown in FIGS. 1, 5, 9 and 10 in which the needles are directly applied against the end wall of the bearing it is advantageous to arrange that the diameter of the washer be greater than the diameter of the trunnion and less than the diameter of the opening of the bearing.

FIGS. 11 to 14 show that the washer serves to resist in its center portion the end of the trunnion and in its peripheral portion the thrust exerted by the needles.

Having now described my invention what I claim as new and desire to secure by Letters Patent is:

1. In a method for mounting a cylindrical bearing around a trunnion having an end face of a cross member of a universal joint, the cylindrical bearing being open at one end and closed by an end wall at the other end of the bearing, by fitting the bearing in a bore of a corresponding yoke of the joint so that, in a final position of the bearing in said bore, the end wall of the bearing affords an elastic support for said end face of the trunnion, the end wall having a center portion which initially forms a depression having a convex side facing said end face and which, by the effect of plastic deformation, has its profile inverted resulting in a dome which has a concave side facing said end face and is connected to an outer peripheral portion of the end wall by a convex annular portion facing said end face, comprising bringing said center portion of said end wall intially merely in contact with said end face in a first stage of said fitting so that a first axial distance between the open end of the bearing and said end face is distinctly less than a second axial distance which must be finally obtained in said final postion of the bearing in said bore; the improvement comprising plastically deforming said center portion by plastically displacing the center portion of said end wall throughout the thickness of the center portion of said end wall relative to the outer peripheral portion of said end wall axially of the bearing by applying a force on said outer peripheral portion said said end face of the trunnion exerting a reaction on said center portion so that said end wall is made to bend in all diametral planes of said end wall by urging the bearing still further into said bore in a final stage of said fitting so as to eliminate the difference between said first and second axial distances and invert said profile and produce said dome and make said end face bear against said convex annular portion and thereby achieve the required elastically yieldable support under the effect of plastic partial return consecutive to said plastic deformation of said center portion.

2. In a method for mounting a cylindrical bearing around a trunnion having an end face, of a cross member of a universal joint by fitting the bearing in a bore of a corresponding yoke of the joint, the cylindrical bearing being open at one end and closed by an end wall at the other end of the bearing so that, in a final position of the bearing in said bore, said end wall, in combination with a disc coaxial with the bearing and interposed between said end wall and said end face, affords an elastic support for said end face, said disc having a wall comprising an outer peripheral annular portion bearing against said end wall and a center portion which initially forms a depression having a convex side facing said end face and which, by the effect of plastic deformation, has its profile inverted resulting in a dome which has a concave side facing said end face and is connected to said peripheral portion of said disc by a convex annular portion facing said end face, comprising bringing said end wall and said disc in mutual contact and said center portion of said disc merely in contact with said end face in a first stage of said fitting so that a first axial distance between the open end of the bearing and said end face is distinctly less than a second axial distance which must be finally obtained in said final position of the bearing in said bore; the improvement comprising plastically deforming said center portion by plastically displacing the wall of the center portion throughout the thickness of the wall of the center portion relative to said outer peripheral portion of the disc axially of the disc by applying a force on said outer peripheral portion through the agency of the end wall of the bearing with said end face of the trunnion exerting a reaction on said center portion so that the disc is made to bend in all diametral planes of the disc by urging the bearing still further into said bore in a final stage of said fitting so as to eliminate the difference between said first and second axial distances an invert said profile and produce some dome and make said end face bear against said convex annular portion and thereby achieve the required elastically yieldable support under the effect of elastic partial return consecutive to said plastic deformation of said center portion.

* * * * *